(12) United States Patent
Jackson

(10) Patent No.: US 9,791,048 B2
(45) Date of Patent: Oct. 17, 2017

(54) TOP ENTRY BALL VALVE, INSTALLATION ASSEMBLY, AND METHOD THEREFOR

(71) Applicant: FISHER CONTROLS INTERNATIONAL LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 62 days.

(21) Appl. No.: 14/729,450

(22) Filed: Jun. 3, 2015

(65) Prior Publication Data

US 2016/0356384 A1    Dec. 8, 2016

(51) Int. Cl.
| | | |
|---|---|---|
| *F16K 1/14* | (2006.01) | |
| *F16K 5/20* | (2006.01) | |
| *F16K 27/06* | (2006.01) | |
| *F16K 5/06* | (2006.01) | |

(52) U.S. Cl.
CPC .............. *F16K 1/14* (2013.01); *F16K 5/0636* (2013.01); *F16K 5/201* (2013.01); *F16K 27/067* (2013.01)

(58) Field of Classification Search
CPC ........................................................ F16K 1/14
USPC .................................................... 251/315.12
See application file for complete search history.

(56) References Cited

U.S. PATENT DOCUMENTS

| | | | |
|---|---|---|---|
| 3,830,465 A | | 8/1974 | Allen |
| 4,390,039 A | * | 6/1983 | Johnson ................ F16K 5/0636 137/315.21 |
| 4,566,482 A | * | 1/1986 | Stunkard ............... F16K 5/0636 137/240 |
| 4,718,444 A | | 1/1988 | Boelte |

FOREIGN PATENT DOCUMENTS

| | | |
|---|---|---|
| GB | 1215159 A | 12/1970 |
| JP | S5189225 A | 8/1976 |
| JP | S60263780 A | 12/1985 |

OTHER PUBLICATIONS

Search Report for International application No. PCT/US2016/035621, mailed Sep. 13, 2016.
Written Opinion for International application No. PCT/US2016/035621, mailed Sep. 13, 2016.

* cited by examiner

*Primary Examiner* — Mary McManmon
*Assistant Examiner* — Patrick Williams
(74) *Attorney, Agent, or Firm* — Marshall, Gerstein & Borun LLP

(57) ABSTRACT

An installation assembly for installing and/or removing a ball into and/or from a valve body of a top entry ball valve includes a valve body having at least one blind bore disposed on an opposite side of the ball chamber from the entry opening and a ball installation tool adapted to interact with the blind bore so as to compress a spring disposed inside the ball chamber substantially axially. A top entry ball valve is arranged with such a valve body. The ball installation tool may be used to install and/or remove a ball from the valve body.

15 Claims, 2 Drawing Sheets

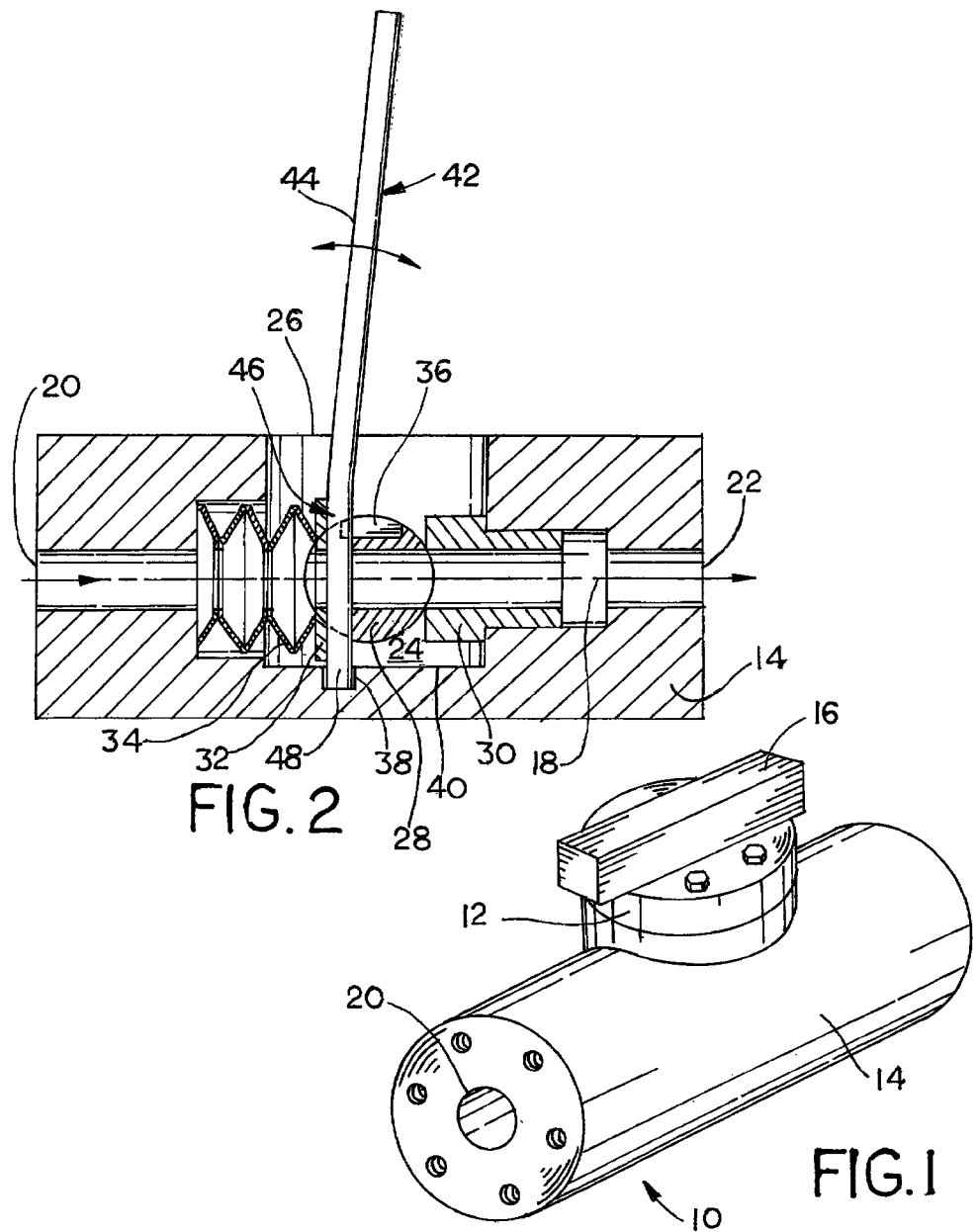

TOP ENTRY BALL VALVE, INSTALLATION ASSEMBLY, AND METHOD THEREFOR

FIELD OF THE DISCLOSURE

The present disclosure relates to a ball valve, an installation assembly, and a method adapted for inserting and/or removing a ball from the valve body of the ball valve.

BACKGROUND ball valves are often classified as either top entry ball valves or side entry ball valves. A side entry ball valve is generally characterized in that a portion of the valve body on either the inlet or outlet side of the valve can be removed in order to install and/or remove a ball flow control member into or from a ball chamber inside the valve body. Generally, if it is required to remove or install the ball from the ball chamber, this design requires the ball valve to be disconnected and removed from any process components, such as pipes or other components, so that the side of the valve can be removed. However, this makes it difficult, if not impossible, to remove and/or insert the ball while the side entry ball valve is installed in-line in the field.

In contrast, a top entry ball valve is generally characterized in that the ball may be installed into and/or removed from the ball chamber through an opening in a top wall of the valve body which is spaced between the inlet side and the outlet side of the valve body. Because the inlet and outlet sides of the valve body are not disturbed, it is possible to access the ball inside the ball chamber without removing the top entry ball valve from an installed in-line position in the field. In some instances, this can make it easier to service a top entry ball valve when installed in-line in the field.

However, in some arrangements a top entry ball valve may require special equipment in order to install and/or remove the ball from his operative position inside the valve body. For example, a floating ball valve often has a ball that is compressed between two valve seats by spring in such manner that the valve seats retain the ball in an operative position while the ball can simultaneously be rotated between open and/or closed positions. Frequently, the spring generates a large compression force, such as five hundred pounds force, one thousand pounds force, or possibly even more, in order to retain the ball in its operative position. A trunnion ball valve may in some arrangements also include a spring arranged to press against the ball under similar compression forces. For either of these types of ball valves, it is common to have special tools and/or procedures for retracting the spring in order to be able to remove and/or insert the ball due to the relatively high compression forces generated by the spring.

SUMMARY

According to an aspect of the disclosure, a top entry ball valve includes a valve body that is provided with at least one, and in some arrangements two or more, blind bores extending into a wall of a ball chamber opposite an entry opening into the ball chamber sized to allow insertion and/or removal of the ball from the ball chamber. The one or more blind bores are offset laterally from a central axes of a fluid flow path extending through the ball chamber from an inlet to an outlet. Preferably, the one or more blind bores are adapted to receive and interact with a ball installation tool for inserting and/or removing a ball from the ball chamber.

According to another aspect of the disclosure, an installation assembly for installing and/or removing a ball into and/or from a valve body of a ball valve includes a valve body having at least one such blind bore disposed on an opposite side of the ball chamber from the entry opening and also a ball installation tool adapted to interact with the blind bore so as to compress a spring disposed inside the ball chamber substantially axially.

According to another aspect of the disclosure, a method of installing or removing a ball into or out of a valve body on a top entry ball valve according to the present disclosure with a ball installation tool according to the present disclosure includes operatively inserting the ball installation tool into at least a first blind bore, compressing a spring disposed inside the ball chamber with the ball installation tool by pivoting the ball installation tool, and inserting or removing the ball from the ball chamber while the spring is compressed by the ball installation tool.

In some arrangements, a top entry ball valve may include a valve body defining a fluid flow path having an inlet, and an outlet, and a ball chamber disposed between the inlet and the outlet. A ball may be disposed within the ball chamber to be rotated to control flow of fluid through the valve body. A valve seat may be disposed adjacent the ball. A spring may be arranged to urge the ball axially along the fluid flow path toward the valve seat. An entry opening may extend through the valve body into the ball chamber. The entry opening may be sized to allow insertion and/or removal of the ball from the ball chamber. A first blind bore may extend from the ball chamber into a wall of the ball chamber on an opposite side of the ball from the entry opening. The first blind bore may be offset laterally from a central axis of the fluid flow path extending through the ball chamber from the inlet to the outlet.

In some arrangements, an installation assembly for operatively installing a ball into a valve body of a ball valve may include the valve body and a ball installation tool. The valve body may include a ball chamber to receive the ball so as to be rotated to control flow of fluid through the valve body along a fluid flow path extending from an inlet to an outlet, an entry opening through the valve body into the ball chamber, and at least a first blind bore into the valve body from the ball chamber. The first blind bore may be disposed on an opposite side of the ball chamber from the opening. The first blind bore may be offset laterally from the fluid flow path. The ball installation tool may include a handle extending from a first to a second end, and a spring engagement section disposed at the second end. The spring engagement section may include at least a first tine to be removably received within the first blind bore. The handle may extend out of the valve body through the opening when the first tine is received within the first blind bore. The spring engagement section may be arranged to compress a spring disposed inside the ball chamber, for example, axially along the fluid flow path, when the first tine is received within the first blind bore.

In some arrangements, a method of installing or removing a ball into or out of a valve body of a top entry ball valve with a ball installation tool is provided. The valve body may define a fluid flow path having an inlet and an outlet connected by a ball chamber disposed between the inlet and the outlet, an entry opening through the valve body into the ball chamber, and at least a first blind bore disposed on an opposite side of the ball chamber from the opening and offset laterally from a central axis of the fluid flow path. The ball installation tool may a handle extending from a first to a second end, a spring engagement section disposed at the second end, the spring engagement section including at least a first tine. The method may include operatively inserting the ball installation tool into the first blind bore; compressing a spring disposed inside the ball chamber with the spring engagement section by pivoting the handle toward the spring while the ball installation tool is operatively disposed in the first blind bore; and inserting or removing the ball from the ball chamber while the spring is compressed with the spring engagement section of the ball installation tool.

Any one or more of the foregoing aspects and/or arrangements may optionally include any one or more of the following features.

In some arrangements, the ball valve may be a floating ball valve or a trunnion valve.

In some arrangements, the valve body may include a second blind bore extending from the ball chamber into the wall of the ball chamber on the opposite side of the ball chamber from the entry opening. Preferably, the first blind bore and the second blind bore may be spaced apart from each other and disposed on laterally opposite sides the fluid flow path extending through the ball chamber from the inlet to the outlet. Optionally, the first blind bore and/or the second blind bore are disposed along the axial length of the valve shaft between the spring and at least a portion of the ball.

In some arrangements, the spring engagement section of the ball installation tool includes a second tine. The first and second tines may be offset on opposite lateral sides of the handle. The second tine may be arranged to be removably received within the second blind bore simultaneously when the first tine is removably received within the first blind bore. When so inserted, the first and second tines preferably may be disposed on opposite lateral sides of the fluid flow path. Preferably, the first and second blind bores may be to operatively receive first and second tines from the ball engagement tool so as to reduce or eliminate twisting forces on the ball engagement tool when operatively used to retract the spring.

In some arrangements, the entry opening may be larger than the first blind bore. Where the valve body includes a second blind bore, the entry opening may have a width that is larger than the distance between the first blind bore in the second blind bore. For example, the entry opening may encompass both the first bore in the second bore.

In some arrangements, the handle of the ball installation tool may be disposed at an angle relative to at least a portion of the spring engagement section. For example, the handle may be disposed at an angle relative to the first and/or second tines. More specifically, a longitudinal axis of the handle may be disposed at an angle (i.e., not coaxial or parallel with) relative to a plane and/or longitudinal axes of the one or more tines. The angle may be between zero and forty five degrees and in some preferred arrangement is between about ten and fifteen degrees.

In some arrangements, operatively inserting the ball installation tool into the one or more blind bores includes inserting the spring engagement section into the ball chamber through the entry opening such that the one or more tines are disposed in respective ones of the one or more blind bores and so that the handle extends out of the ball chamber through the entry opening.

In some arrangements, compressing the spring may include forming a fulcrum of the first and/or second blind bore about which the ball insertion tool pivots when the handle is pivoted toward the spring. Compressing the spring may include urging the spring engagement section of the ball installation tool toward the spring or a valve seat. Compressing the spring may include forming a lever arm with the handle that increases a first lateral force acting against the first end of the handle to a second, larger lateral force acting against the spring or valve seat.

Additional aspects and arrangements of the disclosure will become apparent upon studying the following detailed description of an exemplary arrangement and the accompanying drawings.

BRIEF DESCRIPTION OF THE DRAWINGS

FIG. 1 is an isometric view of a top entry ball valve;

FIG. 2 is a longitudinal cross-sectional view of portions of the top entry ball valve illustrating an installation assembly including a ball installation tool;

DETAILED DESCRIPTION

Figure 3:
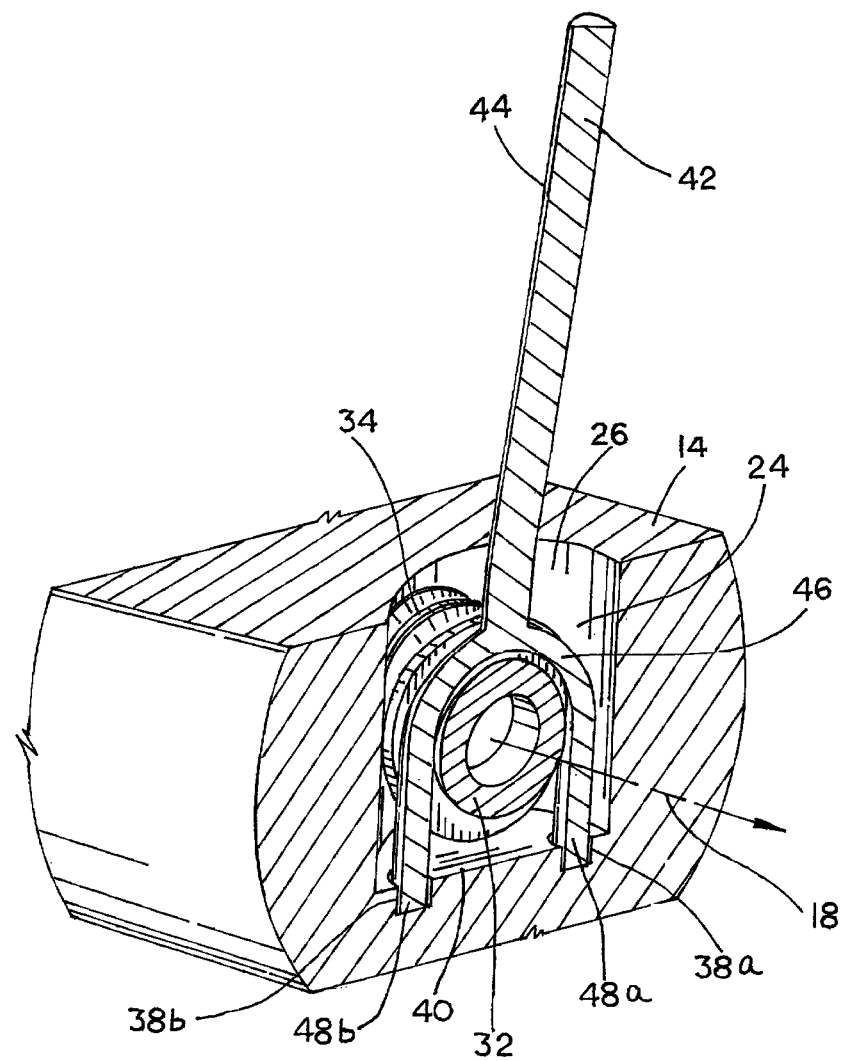
FIG. 3 is an isometric view of a lateral cross-section of portions of the top entry ball valve and ball installation tool.

Turning now to the drawings, FIG. 1 illustrates an example ball valve 10 according to some aspects of the disclosure that provides for relatively simple installation and/or removal of a ball flow control member, in particular when the ball valve 10 is already installed in-line in a process line, for example between two pipes or other types of process equipment. The ball valve 10 in this arrangement is a top entry ball valve, and may be connected between adjacent pipe sections, for example, by welding and/or with bolts or other fasteners. Preferably, the ball valve 10 is a floating ball valve; however, in some arrangements ball valve 10 may be a trunnion ball valve. The ball valve 10 is shown with a bonnet 12 operatively coupled to a top side of a valve body 14. An actuator 16 is operatively coupled to the bonnet 12 and arranged to rotate a valve stem (not shown) for opening and/or closing a ball disposed inside the valve body 14 for controlling the flow of fluid through the valve body. The actuator 16 may be any suitable actuator for rotating the valve stem.

FIGS. 2 and 3 illustrate the ball valve 10 without the bonnet 12 or actuator 16 coupled to the valve body 14 and without a valve stem for ease of visualization and to illustrate a usual arrangement of the ball valve 10 when inserting and/or removing a flow control member, such as ball 28, from the valve body 14. As best seen in FIG. 2, the valve body 14 defines a fluid flow path 18 extending from an inlet 20 to an outlet 22. In addition, because this is a top entry ball valve, the body preferably does not split apart, but rather is preferably formed of a single, unitary piece extending between the inlet 20 and the outlet 22. A ball chamber 24 is defined inside the valve body 14 along the fluid flow path 18 operatively spaced between the inlet 20 and the outlet 22. An entry opening 26 is defined in a top side of the valve body 14. The entry opening 26 extends through a top wall of the valve body 14 into the ball chamber 24. The entry opening 26 is located axially between the inlet 20 and the outlet 22. Preferably, the entry opening extends substantially transversely to the fluid flow path 18. The entry opening 26 is sized to allow insertion and/or removal of the flow control member, i.e., the ball 28, from the ball chamber 24. Because the entry opening 26 extends through a top side of the valve body 14 and is transverse to the fluid flow path 18, the ball 28 can be selectively inserted and/or removed from the ball chamber 24 without having to disassemble and/or remove a portion of the valve body 14 at either the inlet 20 or the outlet 22, as would be common for a typical side entry ball valve. Thus, the top entry ball valve 10 may be serviced while remaining connected in-line to pipes or other process equipment (not shown) on the inlet and outlet sides of the valve body 14 without removing the valve body 14 from the pipes or process equipment.

The ball 28 is operatively arranged in the ball chamber 24 so as to be able to be rotated to control the flow of fluid through the valve body 14 along the fluid flow path 18. Thus, in one rotational position, the ball 28 prevents or impedes fluid flow along the fluid flow path 18 and in another rotational position (as illustrated in FIGS. 2 and 3), the ball 28 allows or allows more fluid flow along the fluid flow path, in any suitable manner understood in the art. In this example, the ball 28 is arranged in a floating ball valve arrangement. Thus, the ball 28 is compressed or clamped between a first valve seat 30 and a second valve seat 32 by a spring 34 so as to be retained therebetween while simultaneously being able to be operatively rotated therebetween to control the flow of fluid along the fluid flow path 18, as explained above and understood in the art. In this arrangement, the first valve seat 30 is a pressed seat having a neck portion, which is press fitted into a first bore extending from a sidewall of the ball chamber 24 axially along the outlet 22, and a seat portion, against which the ball 28 is sealingly and rotatably seated. However, the first valve seat 30 may optionally take other forms depending on the overall requirements of the valve. The spring 34 in this arrangement is a Belleville spring formed by a plurality of Belleville washers; however the spring 34 may take other forms, such as a coil spring or other resilient member adapted to operatively retain the ball 28 and allow fluid flow along the fluid flow path 18 as described herein. The spring 34 is disposed in a second bore extending into the sidewall of the ball chamber axially along inlet 20. The spring 34 urges the second valve seat 32 into sealing engagement against the ball 28 and also allows rotational movement of the ball 28. Thus, the ball 28 is clamped between the first valve seat 30 and the second valve seat 32 by the compressive forces of the spring 34. In some arrangements, the second valve seat 32 may be separable from the spring 34 or may be integral with the spring 34. In some arrangements, the spring 34 itself may form the second valve seat 32 without an additional structure. The ball 28 includes a socket 36 on the top side thereof for receiving a valve stem (not shown) arranged to rotate the ball clockwise and/or counterclockwise about an axes extending laterally, and preferably perpendicularly through the fluid flow path 18 and through the top entry opening 26. With the ball 28 in an open position, fluid flowing into the valve body 14 through the inlet 20 subsequently flows along the fluid flow path 18 through the spring 34, the valve seat 32, a bore or other opening through the ball 28, the first valve seat 30, and finally on outwardly through the outlet 22. To close the ball valve 10, the ball 28 is rotated by the valve stem to a closed position such that the bore or other opening through the ball 28 is no longer aligned with the fluid flow path 18. In other arrangements, the ball 28 could be arranged in a trunnion arrangement, wherein a trunnion extending downwardly from the ball along an axes extending perpendicularly through the fluid flow path 18 is received within a complementary recess, which is aligned laterally with the axes of the fluid flow path 18 within the ball chamber 24. However, the remaining description focuses on the floating ball valve arrangement exemplified in the figures.

At least one, and preferably two blind bores, a first blind bore 38a and a second blind bore 38b, extend into a bottom wall 40 of the ball chamber 24. The blind bores 38a, 38b are arranged to receive portions of a ball installation tool 42 for installing and/or removing the ball 28 from between the spring 34 and the first valve seat 30, as described in detail hereinafter. The bottom wall 40 of the ball chamber 24 is disposed opposite the entry opening 26 through the top wall of the valve body 14. Each of the first blind bore 38a and the second blind bore 38b extends from the ball chamber 24 into the bottom wall 40 on an opposite side of the ball 28 from the entry opening 26. As best seen in FIG. 3, the first blind bore 38a is offset laterally to one side of the longitudinal axis of the fluid flow path 18 extending through the ball chamber 24 from the inlet 20 to the outlet 22. The second blind bore 38b is offset laterally to the opposite side of the axis of the fluid flow path 18. Preferably, the first blind bore 38a and the second blind bore 38b are aligned perpendicular to the axis of the fluid flow path 18. Also preferably, the first blind bore 38a and the second blind bore 38b are spaced longitudinally along the fluid flow path 18 between at least a portion of the ball 28 and the spring 34 and/or the second valve seat 32. As best seen in FIG. 2, the blind bores 38a, 38b are located axially along the fluid flow path 18 in a location between the valve seat 32 and the socket 36 at the top apex of the ball 28. Also preferably, each of the first blind bore 38a and the second blind bore 38b are each laterally offset the same distance from the axis of the fluid flow path 18. Further, the entry opening 26 preferably encompasses each of the first blind bore 38a and the second blind bore 38b such that the ball installation tool 42 may be inserted into both of the blind bores 38a, 38b simultaneously through the entry opening 26. Thus, the entry opening 26 is also preferably larger than each of the first blind bore 38a and the second blind bore 38b. Further, the entry opening 26, where it encompasses the first and second blind bores 38a and 38b, is preferably at least as wide, and more preferably, wider than the distance between the first blind bore 38a and the second blind bore 38b. In the exemplary arrangement of the drawings, the blind bores 38a and 38b extend only part way through the bottom wall 40 of the ball chamber 24; however in other arrangements, the blind bores 38a and 38b may be formed with through bores extending completely through the bottom wall 40 that are subsequently plugged, for example, with a plug or bolt.

The ball installation tool 42 includes a handle 44 and a spring engagement section 46. The handle 44 extends from a first end to a second end, and preferably is in the form of a straight bar extending between the first and second ends, although the handle may have other shapes and include additional features. The spring engagement section 46 is disposed at the second end of the handle 44. The spring engagement section 46 is arranged to operatively engage and/or compress the spring 34 when inserted into the first and second blind bores 38a, 38b. The spring engagement section 46 may operatively engage the spring 34 either directly or indirectly by engagement against the valve seat 32 and/or other structures that may also compress the spring 34 upon engagement with the engagement section 46. As best seen in FIG. 3, the spring engagement section 46 in this arrangement is in the shape of a fork having a first tine 48a and a second tine 48b. The first and second tines 48a, 48b are spaced apart so as to fit simultaneously into the respective first blind bore 38a and second blind bore 38b. The first and second tines 48a, 48b are preferably disposed on opposite lateral sides of the axis of the handle 44, and even more preferably are offset the same distance from the axis of the handle 44. Thus, in this arrangement, the first tine 48a and the second tine 48b, when received within the respective first and second blind bores 38a, 38b, are disposed on opposite lateral sides of the fluid flow path 18. This arrangement may, in some instances, help prevent undesired twisting of the ball installation tool 42 and/or the spring 34 when compressing the spring.

The handle 44 preferably extends at an angle relative to the spring engagement section 46. For example, the longitudinal axis of the handle 42 may be angled between approximately 1 and 45 degrees, and even more preferably approximately 10 to 15 degrees, relative to the longitudinal axes of the tines 48. Further, the longitudinal axes of the tines 48 are preferably disposed in a single plane such that the plane of the tines 48 is angled relative to the longitudinal axis of the handle 44. However, in other arrangements, the handle 44 may be axially aligned with the spring engagement section 46 rather than being angled thereto.

Preferably, each of the blind bores 38 is larger than, for example having a greater diameter or width than, each of the respective first and second tines 48 such that the tines can pivot backwards and/or forwards toward and away from the spring 34 along the longitudinal axis of the spring 34 when received therein. In this manner, the blind bores 38 form a fulcrum about which the ball installation tool 42 can pivot toward and/or away from the spring 34 for compressing and/or releasing the spring, for example, during installation and/or removal of the ball 28.

The valve body 14 in combination with the ball installation tool 42 form an installation assembly adapted for installing the ball 28 into the valve body of the ball valve 10. The ball installation tool 42 and the valve body 14, for example in a manner as hereinafter described, are adapted to interact with one another particularly to provide a relatively simple way to install and/or remove the ball 28 from the valve body 14 while the ball valve 10 is installed in-line with one or more complementary pieces of process equipment, for example, on the inlet and outlet sides of the valve body 14.

One exemplary method of using the valve body 14 and the ball installation tool 42 for inserting and/or removing the ball 28 into or out of the ball valve 10 is described hereinafter. It is understood, however, that methods of installing and removing the ball 28 are not limited to the specific arrangement of steps, may include additional steps, and/or may include fewer steps. Further, the method may be performed with any variation of the valve body 14 and/or the ball installation tool 42 capable of functioning satisfactorily for retracting the spring 34 and removing and/or inserting the ball 28 with respect to the various steps described hereinafter. For purposes of example, it is assumed that the ball valve 10 is installed in-line between two complementary pieces of process equipment, for example by welding, although the following method may also be implemented when the ball valve, or even just the valve body 14, are not installed in the field.

With the top entry opening 26 open accessible to a user, for example with the bonnet 12 and actuator 16 removed, and also preferably with any valve stem removed from the ball 28, if already installed, as depicted in FIGS. 2 and 3, the ball installation tool 42 is operatively inserted into the blind bores 38. In one exemplary arrangement, the ball installation tool 42 is inserted into the ball chamber 24 through the entry opening 26. In particular, the spring engagement section 46 is inserted through the entry opening 26 such that the tines 48a, 48b are disposed in respective blind bores 38a, 38b and such that the handle 44 extends out of the valve body through the entry opening 26, as shown most clearly in FIG. 2. In arrangements of the installation assembly having fewer or more than tines 48 and/or two blind bores 38, sufficient and/or appropriate numbers of tines are inserted into sufficient and/or appropriate numbers of blind bores so as to be able to pivot the ball installation tool 42 in such a manner as to compress the spring 34 in accordance with the procedure described herein.

With the ball installation tool 42 operatively inserted into the blind bores 38, the ball installation tool 42 is manipulated to compress the spring 34 in order to provide clearance for removing and/or inserting the ball 28 into its operative position between the valve seat 30 in the valve seat 32 and/or the spring 34. In one arrangement, the spring 34, while disposed this operative position in the valve body 14 as described previously, is compressed by pivoting the handle 44 toward the spring 34 while the one or more tines 48 are operatively disposed within respective blind bores 38.

While the spring 34 is so compressed by the ball installation tool 42, the ball 28 may be inserted and/or removed from its operative position in the ball chamber 24. The ball 28 may be inserted and/or removed by hand, with additional tools, or in any other manner sufficient to manipulate the ball 28 in and/or out of its operative position in the ball chamber 24

Preferably, the spring engagement section 46 presses against the valve seat 32 or the spring 34, depending upon the exact arrangement of the ball valve 10, while the blind bores 38 act as a fulcrum about which the ball insertion tool 42 pivots when the handle 42 is pivoted toward the spring 34. In this manner, a significant mechanical advantage can be realized depending upon the length of the handle 42 relative to the distance between the fall comprising of the tines 48 and the location at which the spring engagement section 46 engages the valve seat 32 or spring 34. Thus for example, if the distance between the fulcrum point and the point of engagement between the spring engagement section 46 and the valve seat 32 or spring 34 is 2.5 inches (6.3 cm), and if the length of the handle is 25 inches (63 cm) from that same point of engagement to the distal end of the handle, then a 90 pound force (40 kg) applied to the distal end, i.e., the first end, of the handle in the direction of the spring 34 will result in a 900 (400 kg) pound force against the spring 34 itself, a 10-times mechanical advantage. Of course, other sizes and dimensions may be used, depending on the particular circumstances. Therefore, depending upon the sizing of the ball installation tool 42, the valve body 14, and the spring 34, the installation assembly of the present disclosure can be sized such that a normal worker can both simply and relatively easily retract the spring 34 without requiring extensive additional tooling, which may be expensive and/or time-consuming to construct and arrange in the field, especially when the ball valve 10 is installed in-line. Further, the ball installation tool 42 is preferably formed of a material and/or design capable of operatively withstanding such forces without undesired bending or breaking. In one arrangement, the ball installation tool 42 may be formed of steel; however, other sufficiently strong materials may be used.

Although the example of the drawings has two blind bores, 38a, 38b, that receive the two tines 48a, 48b of the ball installation tool 42, in other arrangements, an installation assembly according to the principles herein may include only a single blind bore 38 for receiving a single-tined ball installation tool or may include three or more blind bores 38 for receiving up to a corresponding three or more tines 48. Thus, for example, although the exemplary embodiment of the figures shows two tines that fit into two respective blind bores, in other arrangements the spring engagement section 46 may include only a single tine that fits into a single blind bore, or more than two tines that would fit into more than two blind bores.

The foregoing detailed description of the depicted embodiments is intended to be exemplary only. The right to all various arrangements and combinations of the various features and aspects described herein, and any obvious variants thereon, within the scope of the appended claims, is expressly reserved.

I claim:

1. A top entry floating ball valve, comprising:
    a valve body defining a fluid flow path having an inlet, and an outlet, and a ball chamber disposed along the fluid flow path between the inlet and the outlet, the fluid flow path having a central axis extending through the ball chamber from the inlet to the outlet;
    a ball disposed within the ball chamber and arranged in a floating ball valve arrangement to be rotated to control flow of fluid through the valve body;
    a valve seat disposed adjacent the ball;
    a spring arranged to urge the ball axially along the central axis of the fluid flow path toward the valve seat;
    an entry opening through a top wall of the valve body into the ball chamber, the entry opening sized to allow insertion and/or removal of the ball from the ball chamber; and
    a first blind bore extending from the ball chamber into a bottom wall of the ball chamber on an opposite side of the ball from the entry opening,
    wherein the first blind bore is offset radially from the central axis of the fluid flow path.

2. The top entry ball valve of claim 1, wherein the entry opening is larger than the first blind bore.

3. The top entry ball valve of claim 1, further comprising:
    a second blind bore extending from the ball chamber into the bottom wall of the ball chamber on the opposite side of the ball chamber from the entry opening,
    wherein the second blind bore is offset radially from the central axis of the fluid flow path, and
    wherein the first blind bore and the second blind bore are spaced apart from each other along an axis that is perpendicular to the central axis of the fluid flow path.

4. The top entry ball valve of claim 3,
    wherein the first blind bore and the second blind bore are disposed longitudinally along the flow path between the spring and at least a portion of the ball.

5. The top entry ball valve of claim 3, wherein the entry opening has a lateral width that is larger than the distance between the first blind bore and the second blind bore.

6. The top entry ball valve of claim 5, wherein the entry opening encompasses the first bore and the second bore.

7. An installation assembly for operatively installing a ball into a valve body of a floating ball valve, the installation assembly comprising:
    a valve body comprising a ball chamber to receive the ball arranged in a floating ball valve arrangement so as to be rotated to control flow of fluid through the valve body along a fluid flow path extending from an inlet to an outlet, an entry opening through a top wall of the valve body into the ball chamber, and a first blind bore into a bottom wall of the valve body from the ball chamber, wherein the first blind bore is disposed on an opposite side of the ball chamber from the opening and offset radially from a central axis of the fluid flow path; and
    a ball installation tool comprising a handle extending from a first to a second end, and a spring engagement section disposed at the second end, wherein the spring engagement section includes a first tine configured to be removably received within the first blind bore, the handle extends out of the valve body through the opening when the first tine is received within the first blind bore, and the spring engagement section is operatively arranged to compress a spring disposed inside the ball chamber axially along the fluid flow path when the first tine is received within the first blind bore.

8. The installation assembly of claim 7,
    the valve body further comprising a second blind bore disposed in the bottom wall on the opposite side of the ball chamber and offset radially from a central axis of the fluid flow path on an opposite side thereof from the first blind bore, and
    the spring engagement section of the ball installation tool further comprising a second tine configured to be removably received within the second blind bore simultaneously when the first tine is removably received within the first blind bore, wherein the first tine and the second tine are disposed on opposite lateral sides of the fluid flow path when so received simultaneously in the respective first blind bore and second blind bore.

9. The installation assembly of claim 8,
    wherein the first and second tines are offset on opposite lateral sides of the handle.

10. The installation assembly of claim 7, wherein the first blind bore is wider than the first tine such that the first tine can pivot within the first blind bore toward and/or away from the spring.

11. The installation assembly of claim 7, wherein the handle is extends at an angle relative to the first tine.

12. A method of installing or removing a ball into or out of a valve body of a top entry floating ball valve with a ball installation tool,
    wherein the valve body defines a fluid flow path having an inlet and an outlet connected by a ball chamber disposed between the inlet and the outlet, the fluid flow path having a central axis extending through the ball chamber from the inlet to the outlet, an entry opening through a top wall of the valve body into the ball chamber, and at least a first blind bore disposed in a bottom wall of the valve body on an opposite side of the ball chamber from the opening and offset radially from the central axis of the fluid flow path, and
    wherein the ball installation tool comprises a handle extending from a first to a second end, and a spring engagement section disposed at the second end, the spring engagement section including at least a first tine, the method comprising:
    operatively inserting the ball installation tool into the first blind bore,
    compressing a spring disposed inside the ball chamber with the spring engagement section by pivoting the handle toward the spring while the ball installation tool is operatively disposed in the first blind bore; and
    inserting or removing the ball arranged in a floating ball valve arrangement from the ball chamber while the spring is compressed with the spring engagement section of the ball installation tool.

13. The method of claim 12,
    wherein operatively inserting the ball installation tool into the blind bore comprises inserting the spring engagement section into the ball chamber through the entry opening such that the first tine is disposed in the first blind bore and the handle extends out of the ball chamber through the entry opening.

14. The method of claim 12,
wherein the valve body further defines a second blind bore extending into the bottom wall of the valve body from the ball chamber on the opposite side of the ball chamber from the entry opening, the second blind bore offset radially from the central axis of the fluid flow path such that the first blind bore and the second blind bore are spaced apart from each other along an axis that is perpendicular to the central axis of the fluid flow path extending through the ball chamber from the inlet to the outlet, and wherein the ball installation tool further comprises a second tine, the first and second tines being offset on opposite lateral sides of the handle, and inserting the ball installation tool includes inserting the first and second tines into respective ones of the first and second blind bores.

15. The method of claim 12, wherein compressing the spring includes:
forming a fulcrum of the first blind bore about which the ball insertion tool pivots when the handle is pivoted toward the spring;
urging the spring engagement section of the ball installation tool toward the spring or a valve seat; and
forming a lever arm with the handle that increases a first lateral force acting against the first end of the handle to a second, larger lateral force acting against the spring or valve seat.

* * * * *

UNITED STATES PATENT AND TRADEMARK OFFICE
CERTIFICATE OF CORRECTION

PATENT NO. : 9,791,048 B2
APPLICATION NO. : 14/729450
DATED : October 17, 2017
INVENTOR(S) : Trenton Frank Jackson Page 1 of 1

It is certified that error appears in the above-identified patent and that said Letters Patent is hereby corrected as shown below:

In the Specification

At Column 1, Line 63, "axes" should be -- axis --.

At Column 2, Line 66, "may a" should be -- may include a --.

At Column 5, Line 44, "axes" should be -- axis --.

At Column 5, Line 57, "axes" should be -- axis --.

At Column 7, Line 6, "handle 42" should be -- handle 44 --.

At Column 8, Line 22, "24" should be -- 24. --.

At Column 8, Line 27, "handle 42" should be -- handle 44 --.

At Column 8, Line 29, "handle 42" should be -- handle 44 --.

In the Claims

At Column 10, Line 32, "is extends" should be -- extends --.

Signed and Sealed this
Fourteenth Day of April, 2020

Andrei Iancu
*Director of the United States Patent and Trademark Office*